United States Patent
Shimizu et al.

[11] 4,282,955
[45] Aug. 11, 1981

[54] ROTARY SHAFT CONTROL SYSTEM

[75] Inventors: Kanryo Shimizu, Tokyo; Kengo Kobayashi, Kawasaki, both of Japan

[73] Assignee: Fujitsu Fanuc Limited, Japan

[21] Appl. No.: 34,601

[22] Filed: Apr. 30, 1979

[30] Foreign Application Priority Data

May 2, 1978 [JP] Japan .................................. 53-52992

[51] Int. Cl.³ ....................... F16D 21/00; B60K 41/02
[52] U.S. Cl. ................................ 192/0.096; 192/48.9; 192/20
[58] Field of Search ...................... 192/0.07, 20, 0.096, 192/0.084, 0.048, 48.7, 48.2, 48.9, 84 R, 87.14, 21, 51; 74/335, 665 GA

[56] References Cited

U.S. PATENT DOCUMENTS

| | | | |
|---|---|---|---|
| 2,211,377 | 8/1940 | Langgasser et al. | 192/21 X |
| 3,101,628 | 8/1963 | Shelley et al. | 192/48.2 X |
| 3,548,987 | 12/1970 | Erickson et al. | 192/51 X |

Primary Examiner—George H. Krizmanich
Attorney, Agent, or Firm—Staas & Halsey

[57] ABSTRACT

A control system for driving a rotary shaft and for positioning the shaft at a commanded position with one motor and two rotation transmission mechanisms of different ratios provided between the motor and the rotary shaft. The two transmission mechanisms are adapted to be selectively actuated to transmit the rotation of the motor to the rotary shaft. The rotary shaft is positioned at a commanded position using a feedback signal from a rotational position detector irrespective of which one of the two transmission mechanisms is employed.

7 Claims, 1 Drawing Figure

ROTARY SHAFT CONTROL SYSTEM

BACKGROUND OF THE INVENTION

1. Field of the Invention

This invention relates to a control system for a rotary shaft which is required to be continuously rotated for turning operations and to be positioned in its direction of rotation, such as the spindle or rotary table of a machine tool.

2. Description of the Prior Art

In a machine tool, turning operations of a workpiece mounted on a spindle is sometimes followed, for example, by milling of the workpiece positioned at a desired commanded angular position. A spindle motor for driving the spindle for the turning operations is very powerful and the rotation during the turning operation is high-speed. Thus, the spindle motor has not been employed to effect positioning of the spindle at a commanded angular position. In the prior art, it is customary to employ both a spindle motor for the turning operations and a motor for the spindle positioning operation. The two motors are selectively driven in accordance with the turning and positioning modes of operation.

Since this conventional system requires two motors and two drive systems the device is bulky and expensive.

SUMMARY OF THE INVENTION

An object of this invention is to provide a rotary shaft control system in which one motor is employed both for driving a rotary shaft and for controlling the positioning of the rotary shaft, thereby making the device small and economical.

Briefly stated, in the rotary shaft control system of this invention, two rotation transmission mechanisms having different ratios are provided between one motor and a rotary shaft in such a manner that they can be selectively used and, irrespective of which one of the transmission mechanisms is employed, the positioning of the rotary shaft is effected by using feedback signals from a rotational position detector coupled to the rotary shaft.

DESCRIPTION OF THE PREFERRED EMBODIMENT

Figure 1:
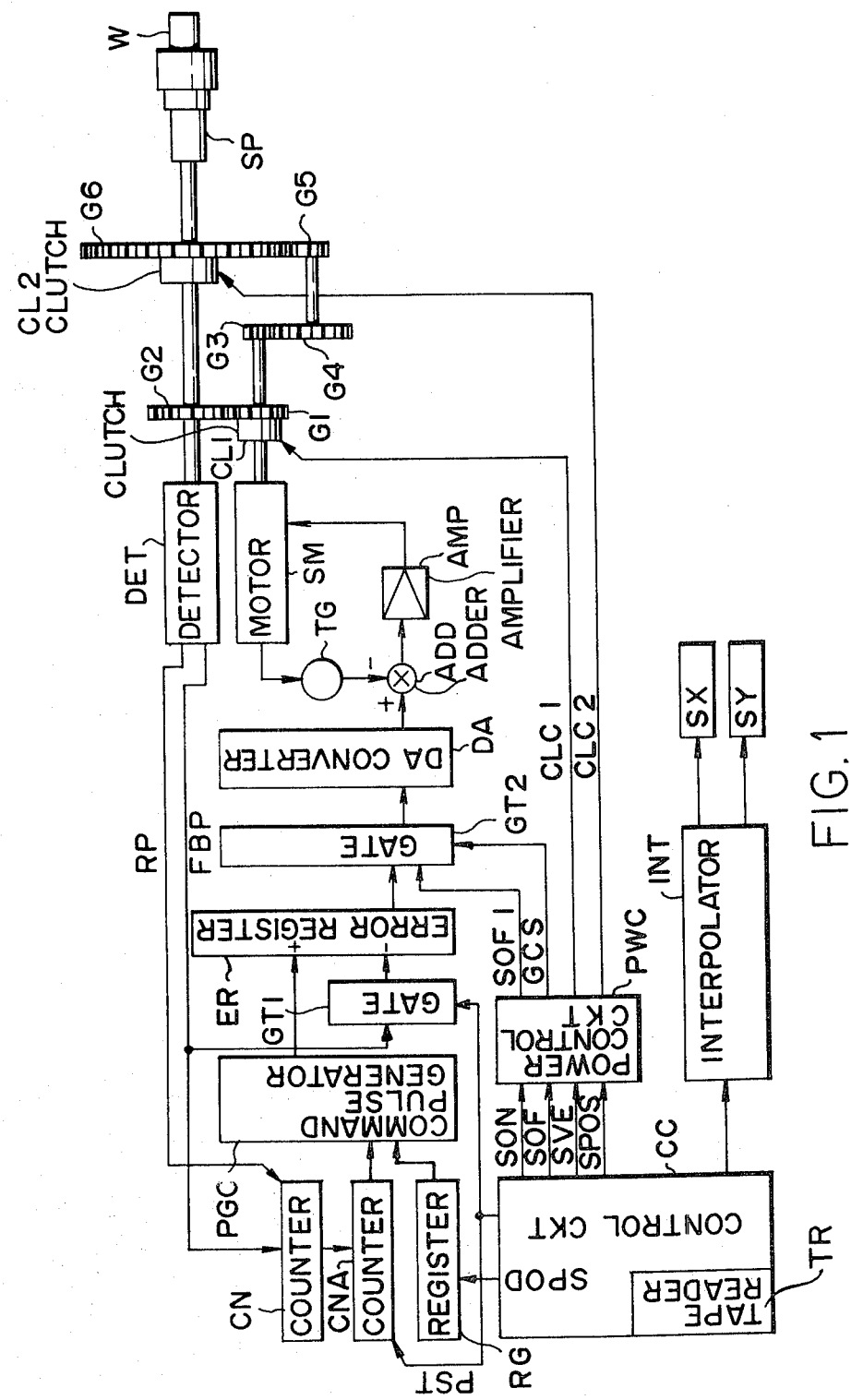
FIG. 1 is a block diagram showing a numerically controlled machine tool embodying this invention.

In the drawing, reference character SP indicates a spindle or like rotary shaft, which supports a workpiece W or a tool, to which the rotation of a single spindle motor SM is transmitted via either one of two transmission mechanisms having different ratios. Reference characters CL1 and CL2 designates clutches; G1 to G6 identify gears forming the transmission mechanisms. With the clutch CL1 ON and the clutch CL2 OFF, the rotation of the motor SM is transmitted to the rotary shaft SP via the clutch CL1 and the gears G1 and G2; with the clutch CL1 OFF and the clutch CL2 ON, the rotation of the motor SM is transmitted to the rotary shaft SP via the gears G3, G4, G5 and G6 and the clutch CL2. Reference character DET denotes a detector coupled to the rotary shaft SP. The detector is a pulse coder which produces a feedback pulse FBP for each angular rotation of the rotary shaft SP and one rotation pulse RP at a specific angular position of the rotary shaft SP. Reference character CN represents a counter, which is reset by the pulse RP and counts the feedback pulses FBP at all times; CNA shows a counter in which the content of the counter CN is preset; RG refers to a register; PGC indicates a command pulse generator; GT1 and GT2 designate gates; ER identifies an error register; DA identifies a D-A converter; AMP denotes an amplifier for driving the motor SM; TG represents a tacho generator; ADD shows an adder; CC refers to a control circuit; PWC indicates a power control circuit; INT designates an interpolator; SX and SY identifies axis servos; and TR denotes a tape reader.

When spindle ON and spindle speed command data on a command tape are read via the tape reader TR, the control circuit CC applies a spindle ON command SON and a spindle speed command SVE to the power control circuit PWC, by which a clutch control signal CLC1 is turned ON and a clutch control signal CLC2 OFF, turning ON the clutch CL1 and OFF the clutch CL2. The power control circuit PWC turns OFF a gate control signal GCS to pass on a speed command value SOF1 via the gate GT2 to the D-A converter DA for conversion into an analog signal. The analog signal and a signal from the tacho generator TG are applied to the adder and the adder output is amplified by the amplifier AMP, thereafter being supplied to the spindle motor SP. As a consequence, the spindle motor SP rotates at a speed corresponding to the speed command SVE to drive the rotary shaft SP for turning operation.

When supplied with spindle OFF data read by the tape reader TR from the command tape, the control circuit CC applies a spindle OFF command SOF to the power control circuit PWC to reset the speed command SOF1 and turn OFF the clutch control signals CLC1 and CLC2.

When spindle positioning command data is read by the tape reader TR from the command tape, the control circuit CC applies a spindle positioning mode signal SPOS to the power control circuit PWC to turn OFF the clutch control signal CLC1 and ON the signal CLC2, thereby driving the spindle at a low speed. Furthermore, the control circuit CC sets a spindle positioning command value SPOD in the register PG and, at the same time, supplies a preset command PST to the counter CNA to preset therein the content of the counter CN. The command pulse generator PGC generates command pulses of a number equal to the difference between the contents of the register RG and the counter CNA and applies the command pulses to the error register ER. By application of the preset signal PST to the counter CNA, the gate GT1 is turned ON, thus permitting the feedback pulses FBP generated thereafter to be negatively fed back to the error register ER. After completion of the presetting, the gate GT2 is turned ON by the gate control signal GCS and the content of the error register ER is applied via the gate GT2 to the D-A converter DA, whose output is provided via the amplifier AMP to the spindle motor SP to drive it.

Accordingly, the spindle motor SM is stopped at a position where the difference between the command position and the current position of the spindle at the time of presetting the content of the counter CN by the preset signal PST in the counter CNA, becomes zero.

With the present invention, it is also possible to effect positioning of the spindle without following the spindle reduction step; namely, the spindle can be positioned with the clutch CL1 held ON and the clutch CL2 OFF. A resolver or the like can be employed, as the detector DET, in place of the pulse coder.

As has been described in the foregoing, this invention enables both rotation of the spindle (the rotary shaft) for turning operation and its positioning through the use of one motor; therefore, the device can be made small and inexpensive.

It will be apparent that many modifications and variations may be effected without departing from the scope of novel concepts of this invention.

What is claimed is:

1. A rotary shaft control system for rotating and positioning a rotary shaft at a commanded position with one motor, comprising:

two rotation transmission mechanisms of different ratios provided between the motor and the rotary shaft;

means for selectively activating one of said two rotation transmission mechanisms;

a rotational position detector, for generating a pulse feedback signal, coupled to the rotary shaft;

feedback means for receiving said pulse feedback signal and for providing a control signal to the motor, wherein the rotary shaft is positioned at the commanded position in accordance with said pulse feedback signal from the rotational position detector irrespective of which one of the two rotation transmission mechanisms is used.

2. A rotary shaft control system according to claim 1, wherein the two rotation transmission mechanisms comprise clutches.

3. A rotary shaft control system according to claim 1, wherein said feedback means comprises counter means for counting pulses from the rotational position detector to indicate the current position of the rotary shaft, and wherein said control signal is generated in such a manner that a difference between the content of said counter means and a positioning command value, representing the commanded position, is reduced to zero.

4. A rotary shaft control system, for rotating and positioning a shaft with one motor, comprising:

a system control circuit for providing output signals consisting of a spindle position command value signal, a preset command signal, a speed command value signal, a gate control signal, a first clutch control signal, and a second clutch control signal;

a first transmission mechanism having a first ratio, operatively connected to said system control circuit and positioned between the motor and the shaft, for rotating the shaft when said first clutch control signal is present;

a second transmission mechanism having a second ratio, operatively connected to said system control circuit and positioned between the motor and the shaft, for rotating the shaft when said second clutch control signal is present;

a detector circuit for detecting the position of the shaft and for providing outputs consisting of a rotation pulse signal and a feedback pulse signal;

positioning means, operatively connected to said detector circuit and said system control circuit, for receiving said spindle position command value signal, said preset command signal, said speed command value signal, said gate control signal, said rotation pulse signal, and said feedback pulse signal, and for outputting said speed command value signal when said gate control signal is off and for outputting an error signal when said gate control signal is present, wherein said error signal is dependent upon said spindle position command value signal and said feedback pulse signal;

a digital to analog converter, operatively connected to said positioning means, for providing an analog signal;

a tachogenerator, operatively connected to the motor for providing a tachogenerator signal; and an adder circuit, operatively connected to said tachogenerator, said digital to analog converter, and to the motor for providing a drive signal to the motor, said drive signal being equal to the difference between said analog signal and said tachogenerator signal, whereby the motor drives the shaft through either said first transmission mechanism or said second transmission mechanism in dependence upon said drive signal and said first and second clutch control signals.

5. A rotary shaft control system as set forth in claim 4, wherein said positioning means comprises:

a first counter circuit, operatively connected to said detector circuit, for counting the feedback pulses in said feedback pulse signal thereby detecting the current angular position of the shaft, said first counter being reset every time a rotation pulse is received;

a register circuit, operatively connected to said system control circuit, for storing and outputting said spindle position command value signal;

a second counter circuit, operatively connected to said first counter circuit and said system control circuit, for presetting the content of said first counter circuit in said second counter circuit when said preset command signal is received by said second counter circuit;

a command pulse generator circuit, operatively connected to said second counter circuit and said register circuit, for outputting a number of command pulses equal to the difference between the content of the register circuit and the content of said second counter circuit;

a first gate, operatively connected to said detector circuit and to said system control circuit, for outputting said feedback pulse signal when said preset command signal is received;

an error register circuit, operatively connected to said command pulse generator circuit and to said first gate, said error register circuit having a content consisting of said command pulses which represent a command position and said error register circuit receiving said feedback pulse signal when said first gate is on, wherein said error register circuit outputs an error signal until the number of feedback pulses received in said feedback pulse signal equals the number of said command pulses; and a second gate, operatively connected to said error register circuit, said analog to digital converter, and said system control circuit, for providing an output consisting of said speed command value signal when said gate control signal is off and for providing said error signal when said gate control signal is on.

6. A rotary shaft control system, for rotating and positioning the shaft of one motor, comprising:

a control circuit for providing output signals consisting of a spindle position command value signal, a preset command signal, a spindle on command signal, a spindle off command signal, a spindle speed command signal, and a spindle position mode signal;

a power control circuit, operatively connected to said control circuit, for receiving said spindle on command signal, said spindle off command signal, said spindle speed command signal, and said spindle position mode signal, and for outputting first and second clutch control signals, a speed command value signal, and a gate control signal;

a first transmission mechanism having a first ratio, operatively connected to said power control circuit and positioned between the motor and the shaft, for rotating the shaft when said first clutch control signal is on;

a second transmission mechanism having a second ratio, operatively connected to said power control circuit and positioned between the motor and the shaft, for rotating the shaft when said second clutch control signal is on;

a detector circuit for detecting the position of the shaft and for providing outputs consisting of a rotation pulse signal and a feedback pulse signal;

a first counter circuit, operatively connected to said detector circuit, for counting the feedback pulses in said feedback pulse signal thereby detecting the current angular position of the shaft, said first counter circuit being reset every time a rotation pulse is received;

a register circuit, operatively connected to said control circuit, for storing and outputting said spindle position command value signal;

a second counter circuit, operatively connected to said first counter circuit and said control circuit, for presetting the content of said first counter circuit and said second counter circuit when said preset command signal is received;

a command pulse generator circuit, operatively connected to said second counter circuit and said register circuit, for outputting a number of command pulses equal to the difference between the content of the register circuit and the content of said second counter circuit;

a first gate, operatively connected to said detector circuit and to said control circuit, for outputting said feedback pulse signal when said preset command signal is received;

an error register circuit, operatively connected to said command pulse generator circuit and to said first gate, said error register circuit having a content consisting of said command pulses which represent a command position and said error register circuit receiving said feedback pulse signal when said first gate is on, wherein said error register circuit outputs an error signal until the number of feedback pulses received in said feedback pulse signal equals the number of said command pulses;

a second gate, operatively connected to said error register circuit and said power control circuit, for providing an output consisting of said speed command value signal when said gate control signal is off and for providing said error signal when said gate control signal is on;

a digital to analog converter, operatively connected to said second gate circuit, for providing an analog signal;

a tachogenerator, operatively connected to the motor, for providing a tachogenerator signal;

an adder circuit, operatively connected to said tachogenerator and to said digital to analog converter, for providing a drive signal by subtracting said tachogenerator signal from said analog signal; and an amplifier circuit, operatively connected between said adder circuit and the motor, for providing an amplified added signal to drive the motor.

7. A rotary shaft control system as set forth in claims 4, 5 or 6, wherein said first and second transmission mechanisms comprise first and second clutches, respectively, and wherein said detector circuit comprises a pulse coder.

* * * * *

UNITED STATES PATENT AND TRADEMARK OFFICE
CERTIFICATE OF CORRECTION

PATENT NO. : 4,282,955
DATED : August 11, 1981
INVENTOR(S) : Shimizu et al

It is certified that error appears in the above—identified patent and that said Letters Patent is hereby corrected as shown below:

Front page, [73] Assignee:, after "Limited," insert --Tokyo,--.

Front page, [56] References Cited, "Langgasser" should be --Langgässer--.

Signed and Sealed this

Twenty-ninth Day of December 1981

[SEAL]

Attest:

GERALD J. MOSSINGHOFF

Attesting Officer

Commissioner of Patents and Trademarks